(12) United States Patent
Shimada et al.

(10) Patent No.: US 10,925,058 B2
(45) Date of Patent: Feb. 16, 2021

(54) OPTICAL TRANSMISSION DEVICE AND BANDWIDTH ALLOCATION METHOD

(71) Applicant: NIPPON TELEGRAPH AND TELEPHONE CORPORATION, Tokyo (JP)

(72) Inventors: Tatsuya Shimada, Yokosuka (JP); Takayuki Kobayashi, Yokosuka (JP); Hiroshi Ou, Yokosuka (JP); Daisuke Hisano, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 231 days.

(21) Appl. No.: 16/310,050
(22) PCT Filed: Jun. 19, 2017
(86) PCT No.: PCT/JP2017/022492
§ 371 (c)(1),
(2) Date: Dec. 14, 2018
(87) PCT Pub. No.: WO2017/221874
PCT Pub. Date: Dec. 28, 2017

(65) Prior Publication Data
US 2019/0182836 A1 Jun. 13, 2019

(30) Foreign Application Priority Data
Jun. 20, 2016 (JP) .................................. 2016-122178

(51) Int. Cl.
*H04W 72/04* (2009.01)
*H04L 12/44* (2006.01)

(52) U.S. Cl.
CPC ......... *H04W 72/0453* (2013.01); *H04L 12/44* (2013.01); *H04W 72/0413* (2013.01)

(58) Field of Classification Search
CPC .......... H04W 72/0453; H04W 72/0413; H04L 12/44; H04Q 2011/0064; H04Q 11/0067
See application file for complete search history.

(56) References Cited

U.S. PATENT DOCUMENTS 8,208,815 B1 * 6/2012 Chiang ............ H04Q 11/0067
398/155
2010/0239255 A1 * 9/2010 Ikeda ................... H04J 3/1694
398/66
(Continued)

FOREIGN PATENT DOCUMENTS

JP 2009152914 A 7/2009
JP 2016-082393 A 5/2016
(Continued)

OTHER PUBLICATIONS

Shimada, Tatsuya et al., "A Study on Functions and Requirements of Optical-Mobile Cooperative IF toward Low Latency TDM-PON System", IEICE Technical Report vol. 116, No. 293, Japan, The Institute of Electronics, Information and Communication Engineers, Nov. 2016.
(Continued)

*Primary Examiner* — Steven H Nguyen
(74) *Attorney, Agent, or Firm* — Harness, Dickey & Pierce, P.L.C.

(57) ABSTRACT

An optical transmission device includes a bandwidth allocator that periodically reads bandwidth request information indicating a bandwidth required for a termination device to transmit an uplink signal from a storage and allocates a bandwidth to the termination device on the basis of the read bandwidth request information, and a timing adjuster that adjusts a period at intervals of which the bandwidth allocator reads the bandwidth request information from the storage on the basis of the timing at which resource information used to generate the bandwidth request information is received from an upper device.

5 Claims, 7 Drawing Sheets

(56) References Cited

U.S. PATENT DOCUMENTS

2015/0171965 A1* 6/2015 Ohteru ............... H04Q 11/0067
398/58
2017/0005724 A1* 1/2017 Nose ....................... H04L 12/44

FOREIGN PATENT DOCUMENTS

WO   WO-2014077168 A1   5/2014
WO   WO-2017149996 A1   9/2017

OTHER PUBLICATIONS

Japanese Office Action regarding JPSN2018524072, dated Jun. 4, 2019.
T.Tashiro et al.. "A Novel DBA Scheme for TDM-PON based Mobile Fronthaul" Tu3F.3 OFC 2014.
S. Kuwano et al., Operator perspective on next-generation optical access for future radio access, In Communications Workshops (ICC), 2014 IEEE International Conference on, Jun. 10, 2014, pp. 376-381.
International Search Report for PCT/JP2017/022492, ISA/JP, dated Aug. 22, 2017, with English translation attached.
Japanese Office Action regarding JP 2018524072, dated Dec. 3, 2019.

\* cited by examiner

FIG. 7

OPTICAL TRANSMISSION DEVICE AND BANDWIDTH ALLOCATION METHOD

CROSS-REFERENCE TO RELATED APPLICATIONS

This application is a 371 U.S. National Stage of International Application No. PCT/JP2017/022492, filed on Jun. 19, 2017, which claims priority to Japanese Patent Application No. 2016-122178, filed on Jun. 20, 2016. The disclosures of the above applications are incorporated herein by reference.

TECHNICAL FIELD

The present invention relates to an optical transmission technology.

BACKGROUND ART

In a passive optical communication network of a time division multiplexing (TDM)—passive optical network (PON) scheme which is widely commercialized and provided at present, a termination device (optical network unit) (ONU) receives an uplink signal from a lower device and transmits a signal indicating bandwidth information (REPORT) necessary to transmit an uplink signal (hereinafter referred to as a "REPORT signal") to a terminal station device (optical line terminal) (OLT). The termination device and the terminal station device are also called an optical subscriber line termination device and an optical subscriber line terminal station device. Upon receiving the REPORT signal, the terminal station device transmits to the termination device a signal indicating information (GATE) regarding a transmission bandwidth and a transmission time (hereinafter referred to as a "GATE signal"), taking into consideration a REPORT signal received similarly from another termination device, ranging information (a transmission duration) between the terminal station device and the termination device, or the like. The termination device transmits an uplink signal on the basis of the GATE signal. Thus, exchange of REPORT and GATE signals causes a delay in the transmission of the uplink signal.

This delay is a bottleneck in low delay required to incorporate the mobile communication network into the TDM-PON system. To solve this problem, the terminal station device previously receives resource information that is transmitted to a lower device through an upper device as proposed in Non-Patent Literature 1. Using the resource information, the terminal station device notifies the termination device of the GATE signal synchronously with the arrival timing of an uplink signal transmitted from a lower device to the termination device. This reduces the delay due to exchange of REPORT and GATE signals, and therefore low delay can be expected.

CITATION LIST

Non-Patent Literature

[Non Patent Literature 1]
T. Tashiro, et al., "A Novel DBA Scheme for TDM-PON based Mobile Fronthaul," Tu3F.3 OFC 2014.

SUMMARY OF INVENTION

Technical Problem

However, the method proposed in Non-Patent Literature 1 does not take into consideration the timing of reading resource information that has been calculated and registered, wherein the resource information is used to generate the GATE signal of which the termination device is to be notified. Therefore, there is a problem that a waiting time (delay time) occurs until the new resource information is reflected in bandwidth allocation to the termination device.

In view of the above circumstances, it is an object of the present invention to provide a technology which can reduce the waiting time until resource information transmitted from an upper device is reflected in bandwidth allocation to a termination device.

Solution to Problem

An optical transmission device according to a first aspect of the present invention is a terminal station device. For example, the optical transmission device includes a bandwidth allocator configured to periodically read bandwidth request information indicating a bandwidth required for a termination device to transmit an uplink signal from a storage and to allocate a bandwidth to the termination device on the basis of the read bandwidth request information, and a tuning adjuster configured to adjust a period at intervals of which the bandwidth allocator reads the bandwidth request information from the storage on the basis of a timing at which resource information used to generate the bandwidth request information is received from an upper device.

According to a second aspect of the present invention, in the optical transmission device according to the above first aspect, the timing adjuster is further configured to notify the bandwidth allocator of a difference in time between a time at which the storage stores the bandwidth request information based on the resource information and a time at which the bandwidth allocator reads the bandwidth request information from the storage and to cause the bandwidth allocator to adjust the period on the basis of the difference in time.

According to a third aspect of the present invention, in the optical transmission device according to the above first aspect, the timing adjuster is further configured to notify the bandwidth allocator of a time obtained by adding a time required until the bandwidth request information based on the resource information is stored in the storage to a time at which the resource information is received and to cause the bandwidth allocator to adjust the period on the basis of the time of which the bandwidth allocator is notified.

According to a fourth aspect of the present invention, in the optical transmission device according to the above second aspect, the timing adjuster is further configured to notify the bandwidth allocator of the difference in time when the difference in time is equal to or greater than a predetermined threshold value and not to notify the bandwidth allocator of the difference in time when the difference in time is smaller than the threshold value.

A bandwidth allocation method according to a fifth aspect of the present invention includes a bandwidth allocation step including periodically reading bandwidth request information indicating a bandwidth required for a termination device to transmit an uplink signal from a storage and allocating a bandwidth to the termination device on the basis of the read bandwidth request information, and a timing adjustment step including adjusting a period at intervals of which the bandwidth request information is read from the storage in the bandwidth allocation step on the basis of a timing at which resource information used to generate the bandwidth request information is received from an upper device.

Advantageous Effects of Invention

According to the present invention, it is possible to reduce the waiting time until the resource information transmitted from the upper device is reflected in the bandwidth allocation to the termination device.

DESCRIPTION OF EMBODIMENTS

First Embodiment

Figure 1:
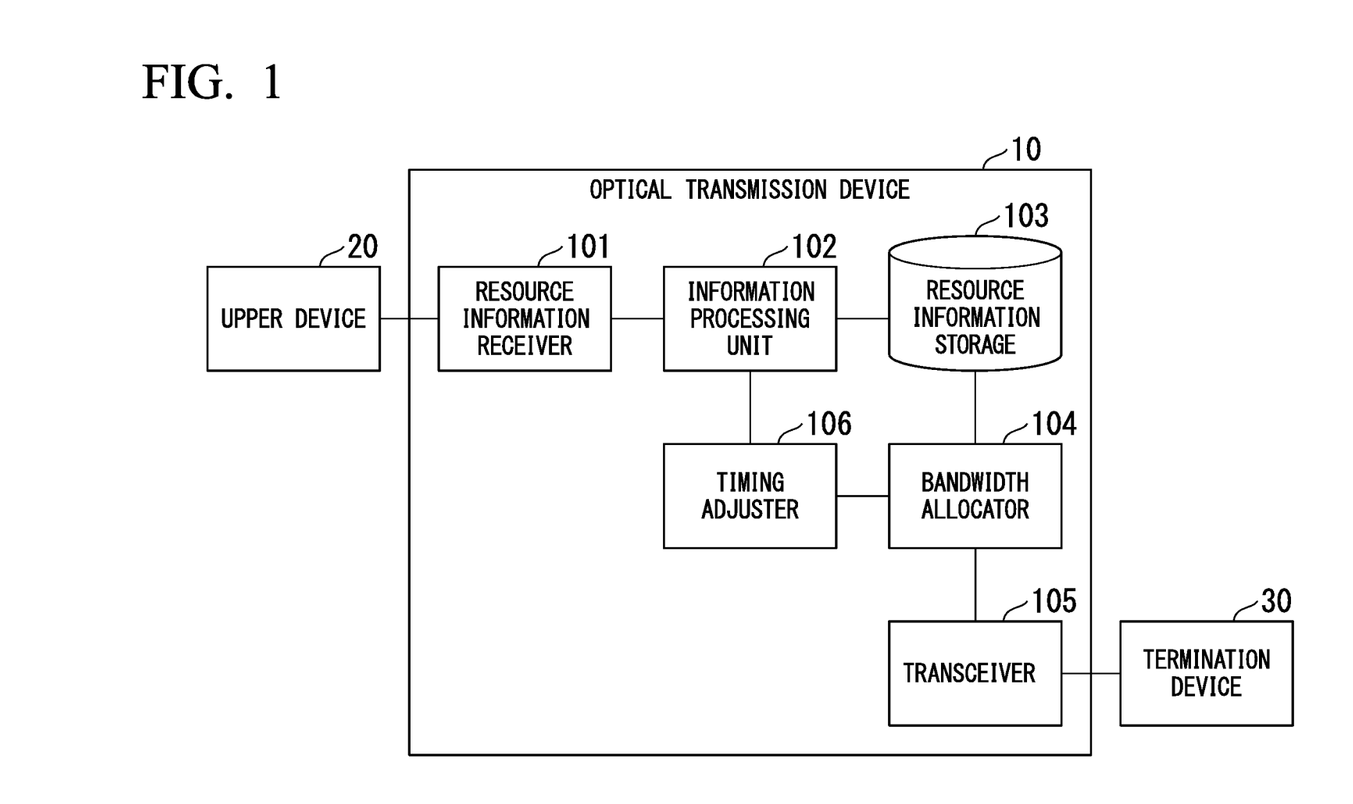
FIG. 1 is a configuration diagram showing a configuration of an optical transmission device according to a first embodiment.

FIG. 1 is a configuration diagram showing a configuration of an optical transmission device 10 according to a first embodiment. The optical transmission device 10 is a device that realizes communication with another communication device using optical signals passing through an optical communication network. The optical communication network to which the optical transmission device 10 is connected is, for example, a passive optical communication network such as a PON. In the passive optical communication network, the optical transmission device 10 is used as a terminal station device. When a mobile communication network is accommodated with the passive optical communication network, the optical transmission device 10 is installed in a station building connected to the mobile communication network. The optical transmission device 10 is connected to an upper device 20 installed in the station building and a termination device 30 installed in a wireless station of the mobile communication network. The optical transmission device 10 includes a resource information receiver 101, an information processing unit 102, a resource information storage 103, a bandwidth allocator 104, a transceiver 105 and a timing adjuster 106.

The resource information receiver 101 is a network interface. The resource information receiver 101 receives resource information 41 from the upper device 20 connected to the optical transmission device 10. The resource information receiver 101 notifies the information processing unit 102 of the received resource information 41. The resource information 41 is transmitted from the upper device 20 at intervals of a predetermined period, and the resource information 41 is necessary to generate a GATE signal. The GATE signal is used for notifying the termination device 30 of a bandwidth allocated to a data signal and a control signal. The optical transmission device 10 determines information (hereinafter referred to as "bandwidth allocation information") which indicates a bandwidth to be allocated to a data signal of an uplink signal. The optical transmission device 10 incorporates the bandwidth allocation information into the GATE signal. The optical transmission device 10 transmits the GATE signal to the termination device 30.

The information processing unit 102 generates information (hereinafter referred to as "REPORT information 42") that is readable by the bandwidth allocator 104 using the resource information 41. The REPORT information 42 indicates the amount of data that is being buffered in the termination device 30. The REPORT information 42 also indicates bandwidth request information requesting that the bandwidth allocator 104 allocate a bandwidth necessary to transmit the data being buffered through an uplink signal. The REPORT information 42 corresponds to bandwidth information that is indicated by a REPORT signal notifying the optical transmission device 10 of the amount of data of the uplink signal that is being buffered in the termination device 30. The information processing unit 102 registers the REPORT information 42 in the resource information storage 103. The information processing unit 102 notifies the timing adjuster 106 of a time T1 at which the REPORT information 42 is registered in the resource information storage 103.

The resource information storage 103 is configured using a storage device such as a magnetic hard disk device or a semiconductor storage device. The resource information storage 103 stores the REPORT information 42.

The bandwidth allocator 104 acquires the REPORT information 42 stored in the resource information storage 103 at intervals of a predetermined reading period 51. The predetermined reading period 51 may be, for example, of a predetermined duration (250 µs in the case of the first embodiment). Another duration may also be used. Using the REPORT information 42, the bandwidth allocator 104 determines a transmission bandwidth and a transmission time for the termination device 30. The bandwidth allocator 104 causes the transceiver 105 to transmit the bandwidth allocation information indicating the determined transmission bandwidth and transmission time to the termination device 30. The bandwidth allocator 104 performs a process of correcting the reading period 51 on the basis of a correction time of which the bandwidth allocator 104 has been notified by the timing adjuster 106. In this correction of the reading period 51 in accordance with the correction time, the bandwidth allocator 104 changes the reading time of the REPORT information 42 without changing the reading period 51 itself. That is, the bandwidth allocator 104 performs the correction by shifting the reading period 51 by the correction time.

The transceiver 105 is a network interface. The transceiver 105 transmits a GATE signal including the bandwidth allocation information to the termination device 30 on the basis of an instruction from the bandwidth allocator 104.

The timing adjuster 106 determines the correction time for the period at intervals of which the bandwidth allocator 104 performs reading of the REPORT information 42. Specifically, the timing adjuster 106 specifies a time T2 at which the bandwidth allocator 104 is to perform reading of the REPORT information 42 immediately after the time T1 of which the timing adjuster 106 has been notified by the information processing unit 102. The timing adjuster 106 calculates the difference in time δ(=T2−T1) between the time T1 and the time T2. The timing adjuster 106 notifies the bandwidth allocator 104 of the difference in time δ as the correction time. The timing adjuster 106 may also specify the time T2 from the reading period 51 and the previous reading time of the bandwidth allocator 104.

The upper device 20 is arranged on the upper side of the optical transmission device 10 in the optical communication network to which the optical transmission device 10 is connected. The upper device 20 is connected to an upper network. The upper device 20 and the optical transmission device 10 are connected one to one.

The termination device 30 is arranged on the lower side of the optical transmission device 10 in the optical communication network to which the optical transmission device 10 is connected. The termination device 30 terminates the optical communication network located between the upper device 20 and the lower device. One or a plurality of termination devices 30 are connected to the optical transmission device 10 via an optical splitter.

Figure 2:
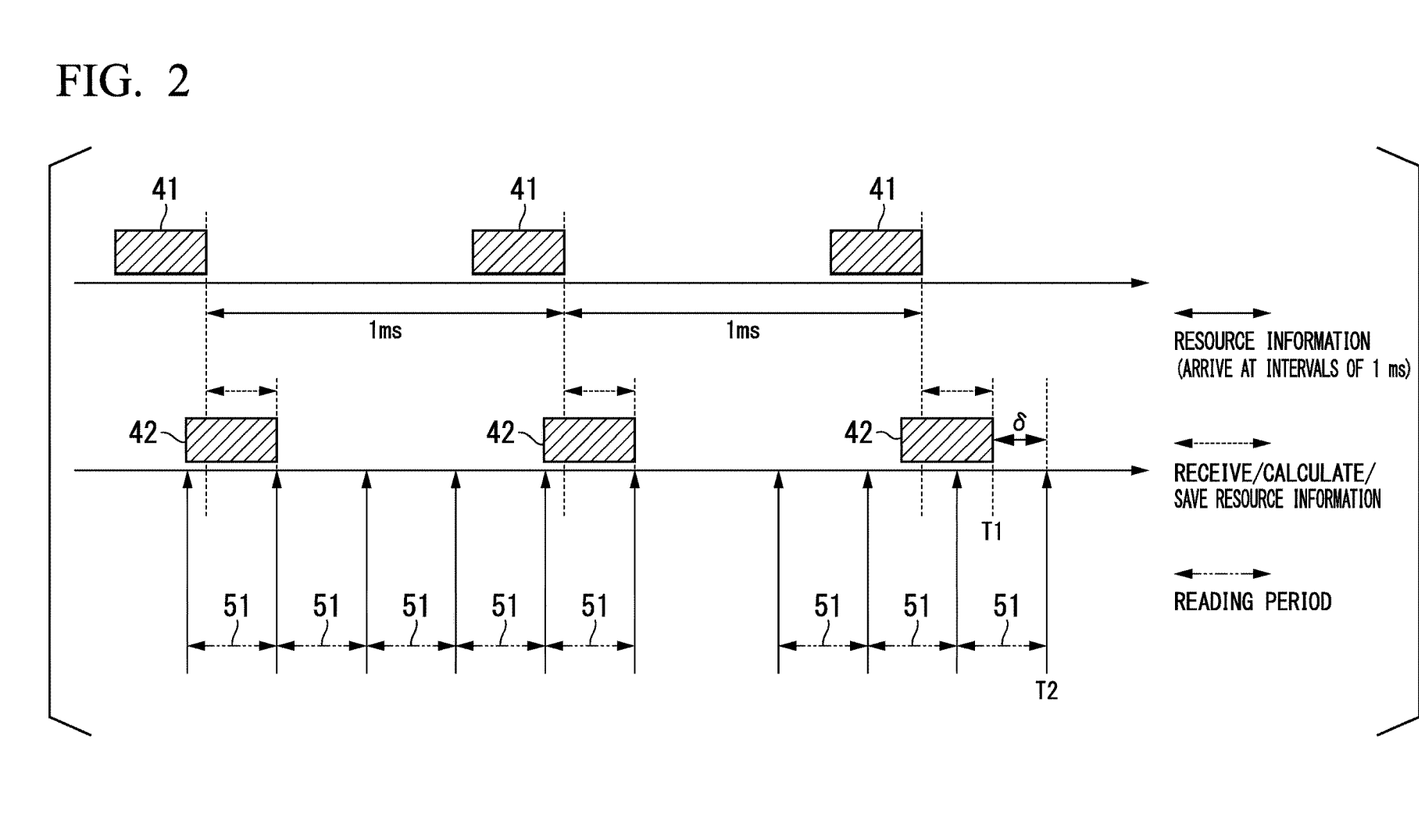
FIG. 2 is a schematic diagram showing specific example processing of the optical transmission device according to the first embodiment.

FIG. 2 is a schematic diagram showing specific example processing of the optical transmission device 10 according to the first embodiment. The optical transmission device 10 receives resource information 41 every 1 ms. Each time the optical transmission device 10 receives the resource information 41, it generates REPORT information 42 from the resource information 41 and stores the REPORT information 42. In order to generate a GATE signal, the optical transmission device 10 reads the REPORT information 42 at intervals of the reading period 51. The optical transmission device 10 performs a process of correcting the reading period 51 in order to reduce the waiting time until the REPORT information 42 is read after being generated. The correction process is performed using the difference in time δ. Through the correction process, the optical transmission device 10 aligns the timing at which the REPORT information 42 according to next resource information 41 is registered with the timing at which the REPORT information 42 is read, and therefore it is possible to reduce the waiting time.

Figure 3:
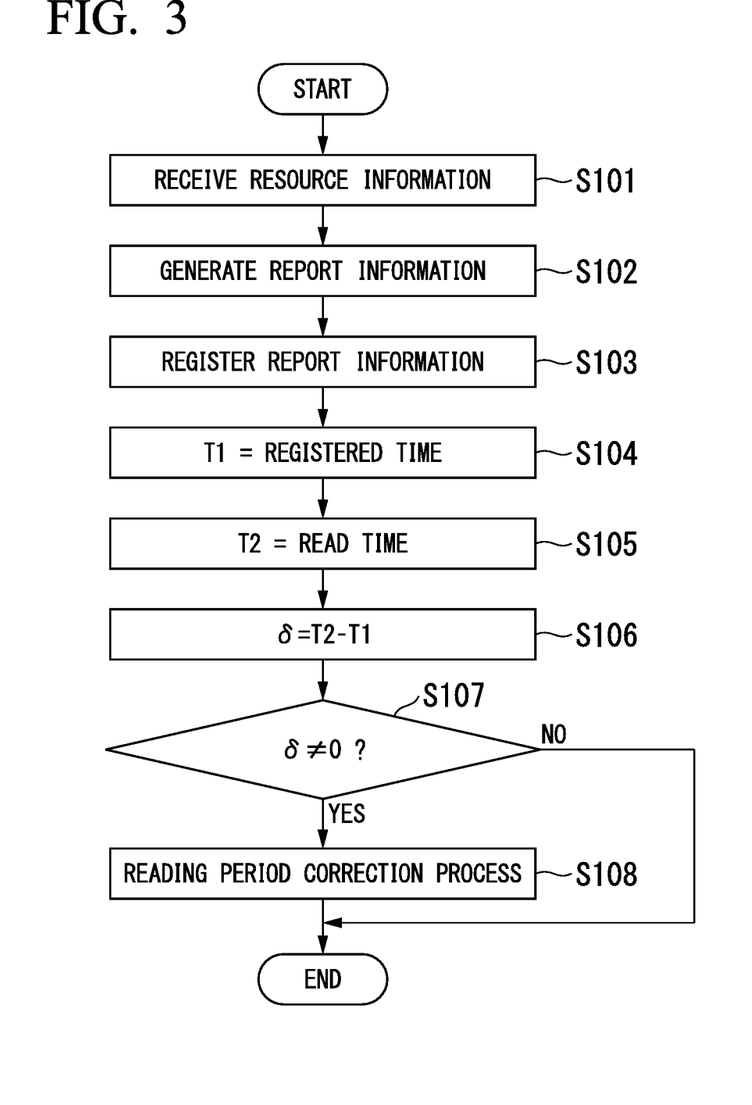
FIG. 3 is a flowchart showing a reading period correction process according to the first embodiment.

FIG. 3 is a flowchart showing a reading period correction process according to the first embodiment. The resource information receiver 101 notifies the information processing unit 102 of resource information 41 received from the upper device 20 (step S101).

The information processing unit 102 generates REPORT information 42 using the resource information 41 (step S102). The information processing unit 102 registers the REPORT information 42 in the resource information storage 103 (step S103). The information processing unit 102 notifies the timing adjuster 106 of a time T1 at which the REPORT information 42 is registered in the resource information storage 103 (step S104).

The timing adjuster 106 specifies a time T2 at which the bandwidth allocator 104 performs reading of the REPORT information 42 immediately after the time T1 (step S105). The timing adjuster 106 calculates the difference in time δ between the time T2 and the time T1 (step S106). The timing adjuster 106 determines whether or not the difference in time δ is 0 (step S107).

When the difference in time δ is not 0 (YES in step S107), the timing adjuster 106 notifies the bandwidth allocator 104 of the difference in time δ as the correction time. The bandwidth allocator 104 performs a process of correcting the reading period 51 on the basis of the correction time (step S108). By performing the correction process to advance the reading time of the REPORT information 42 by the value of the difference in time δ, the bandwidth allocator 104 matches the time at which the information processing unit 102 registers the REPORT information 42 in the resource information storage 103 with the time at which the allocator 104 performs reading of the REPORT information 42.

On the other hand, when the difference in time δ is 0 (NO in step S107), the timing adjuster 106 ends the process. Here, the timing adjuster 106 may notify the bandwidth allocator 104 that the difference in time δ is 0.

Advantages

Figure 4:
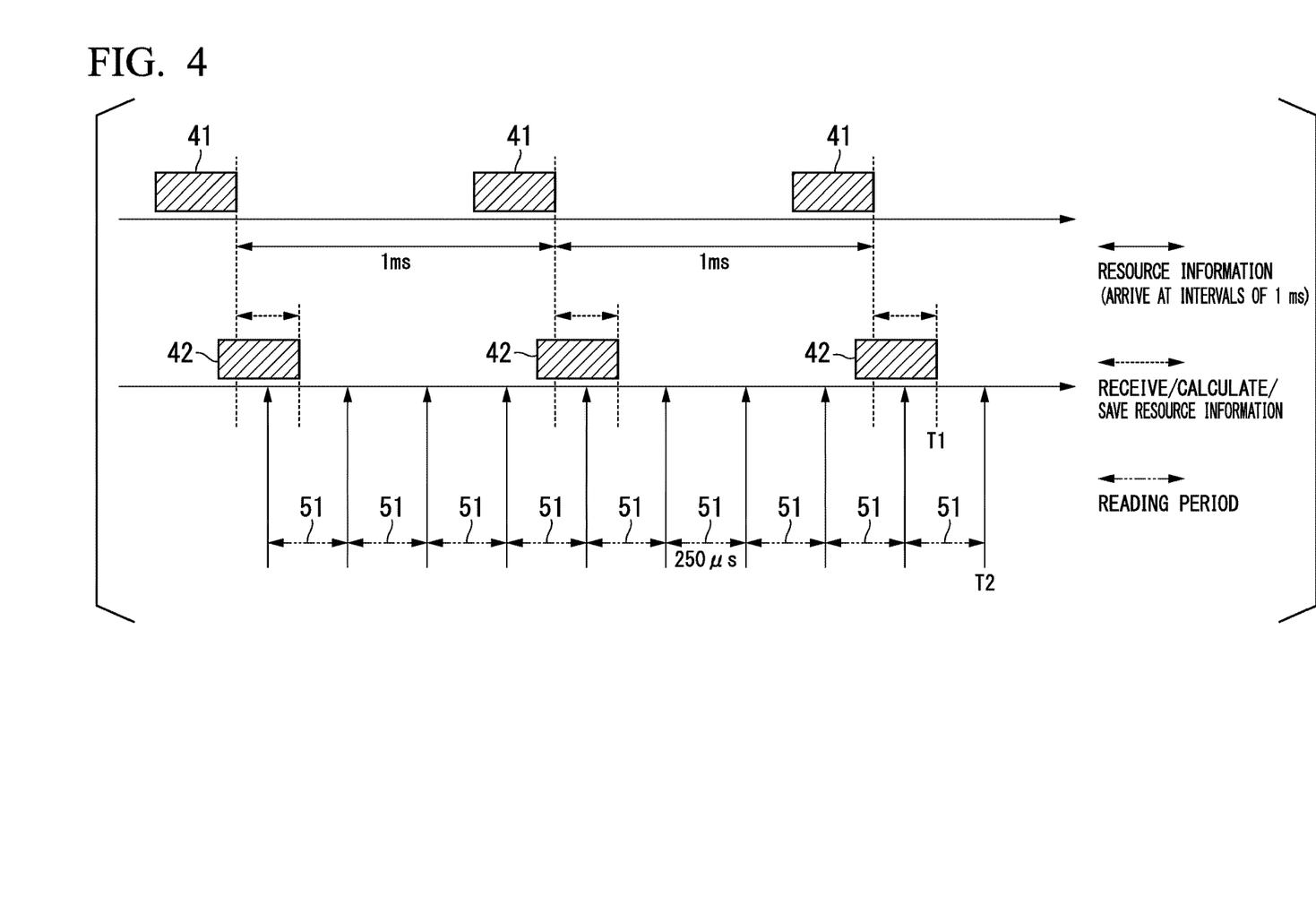
FIG. 4 is a schematic diagram showing a method of realizing low delay of an optical transmission device in the related art.

FIG. 4 is a schematic diagram showing a method of realizing low delay of an optical transmission device in the related art. The optical transmission device in the related art receives resource information 41 every 1 ms and performs reading of REPORT information 42 at intervals of a constant reading period 51 (250 μs). Since the optical transmission device in the related art does not consider the difference between the registration timing and the reading timing of the REPORT information 42, a delay (waiting time) of (T2−T1) occurs from the registration to the reading of the REPORT information 42. On the other hand, the optical transmission device 10 of the first embodiment performs the process of correcting the reading period 51 on the basis of the difference in time δ as shown in FIG. 2. By performing the correction process, the optical transmission device 10 can match the timings of registration with the timing of reading of the REPORT information 42. That is, according to the optical transmission device 10, it is possible to reduce the waiting time from the registration to the reading of the REPORT information 42.

Modification

The bandwidth allocator 104 may add a marginal time α to the difference in time δ. By adding the marginal time α to the difference in time δ, it is possible to perform the process of correcting the reading period 51 even when changes have been made to the time at which resource information 41 arrives at the resource information receiver 101 from the upper device 20, the time at which the resource information 41 is received, the time at which the information processing unit 102 generates REPORT information 42, and the time at which the REPORT information 42 is registered in the resource information storage 103. In the optical transmission device 10 configured in this manner, the processing from step S101 to step S108 need not be performed each time resource information 41 arrives. The marginal time α is determined, for example, on the basis of both a delay time in the transmission path from the upper device 20 to the optical transmission device 10 and a processing time required for signal processing in the optical transmission device 10. The marginal time α may be determined on the basis of the variance of the delay time and the processing time. By adding the marginal time α when performing the correction, the bandwidth allocator 104 can perform correction dealing with fluctuations in the time required until the REPORT information 42 becomes readable.

In another modification, when the value of the difference in time δ is smaller than a predetermined threshold value, the tuning adjuster 106 may end the process as when difference in time δ=0. The predetermined threshold value is determined, for example, using a difference in time δ where a reduction in time of delay according to the difference in time δ in the optical transmission device 10 is smaller than the time required to correct the reading period 51. Alternatively, the threshold value for the difference in time δ is determined, for example, on the basis of an operating frequency of a digital circuit (which may include a processor) forming the resource information receiver 101, the information processing unit 102, the bandwidth allocator 104 and the timing adjuster 106 or the accuracy of a timer provided in the optical transmission device 10. When the difference in time δ is smaller than the threshold value, it is possible to reduce a load of the bandwidth allocator 104 by performing control to prevent the bandwidth allocator 104 from adjusting the reading period 51. It is also possible to easily design and mount the optical transmission device 10 since no excessive accuracy is required for the adjustment of the reading period 51. Here, the tuning adjuster 106 may also compare a value obtained by adding the marginal time α to the difference in time δ with a threshold value and determine whether or not to adjust the reading period 51 in accordance with a result of the comparison.

Second Embodiment

Figure 5:
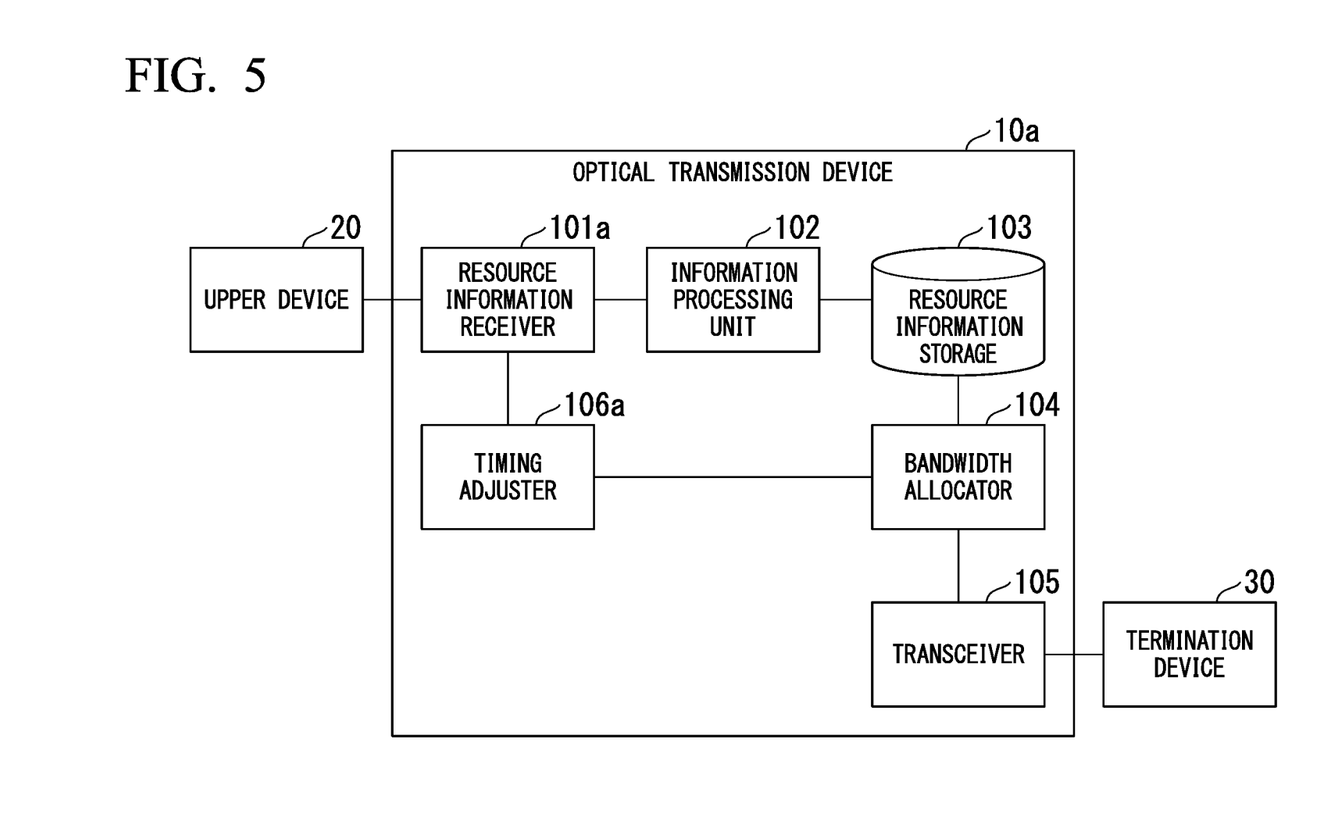
FIG. 5 is a configuration diagram showing a configuration of an optical transmission device according to a second embodiment.

FIG. 5 is a configuration diagram showing a configuration of an optical transmission device 10a according to a second embodiment. The optical transmission device 10a differs from the optical transmission device 10 according to the first embodiment in that it includes a resource information receiver 101a instead of the resource information receiver 101 and a timing adjuster 106a instead of the timing adjuster 106, and otherwise has the same configuration as the optical transmission device 10.

The resource information receiver 101a is a network interface. The resource information receiver 101a receives resource information 41 from an upper device 20 connected to the optical transmission device 10a. The resource information receiver 101a notifies the timing adjuster 106a of a time T31 at which the reception of the resource information 41 is completed. The resource information receiver 101a notifies an information processing unit 102 of the received resource information 41.

The timing adjuster 106a determines a time T61 at which the bandwidth allocator 104 is to perform reading of REPORT information 42. Specifically, the timing adjuster 106a calculates the time T61 by summing a time required for the information processing unit 102 to generate the REPORT information 42, a time β required for the resource information storage 103 to register the REPORT information 42, and the time T31. The timing adjuster 106a notifies the bandwidth allocator 104 of the calculated time T61 as the time at which reading of the REPORT information 42 is to be performed.

Figure 6:
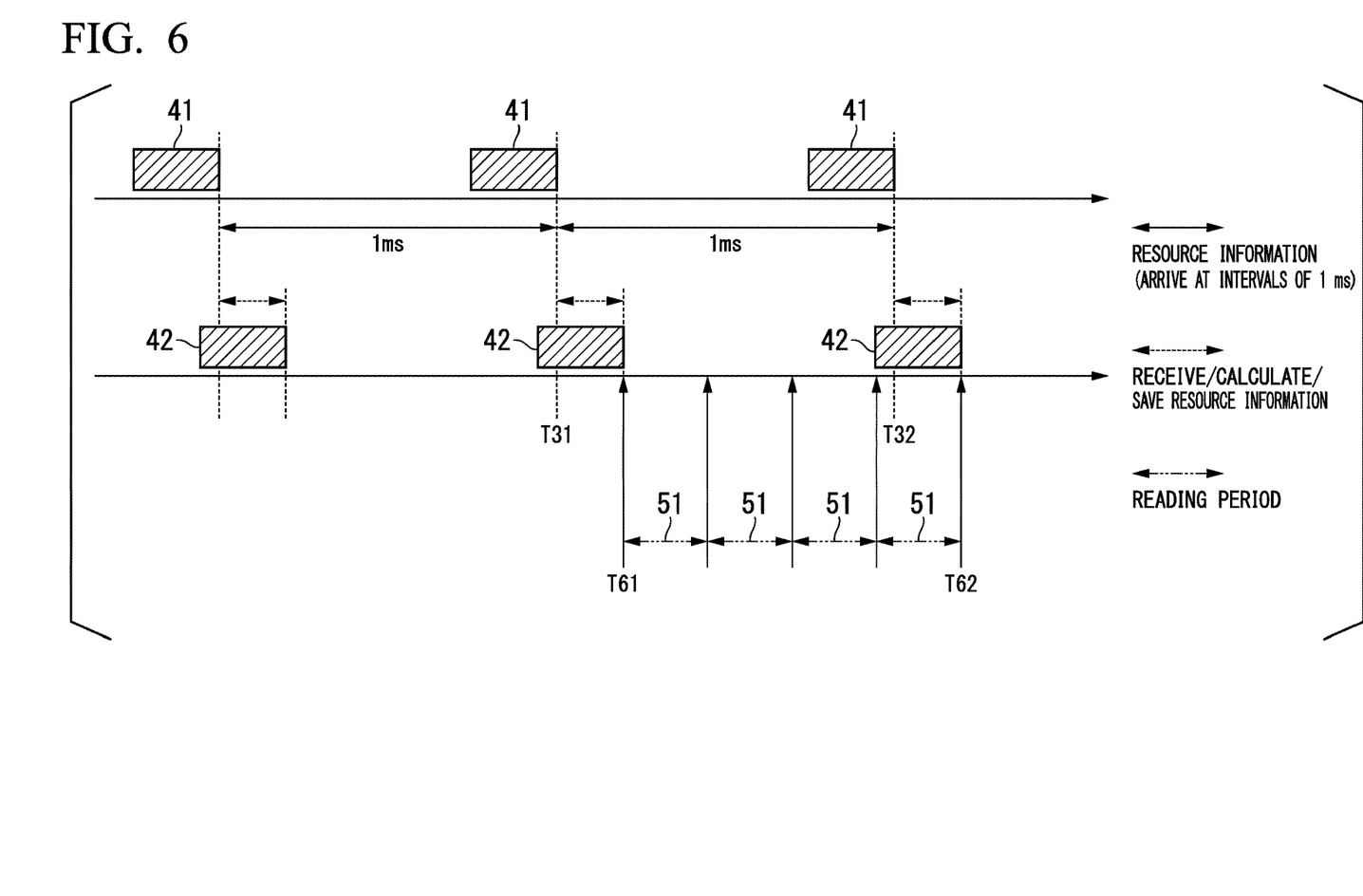
FIG. 6 is a schematic diagram showing specific example processing of the optical transmission device according to the second embodiment.

FIG. 6 is a schematic diagram showing specific example processing of the optical transmission device 10a according to the second embodiment. The optical transmission device 10a receives resource information 41 every 1 ms. The optical transmission device 10 calculates the time T61 at which REPORT information 42 is stored from both the time T31 at which the reception of the resource information 41 is completed and the time required to generate and store the REPORT information 42. The optical transmission device 10a performs reading of the REPORT information 42 at intervals of the reading period 51 starting from the time T61. Similarly, the optical transmission device 10a calculates a time T62 on the basis of a time T32 at which the reception of the resource information 41 is completed and performs reading of the REPORT information 42 at intervals of the reading period 51 starting from the time T62. The optical transmission device 10a reduces the waiting time by adjusting the starting point of the reading period 51 on the basis of the times T31 and T32 at which the reception of the resource information 41 is completed.

Figure 7:
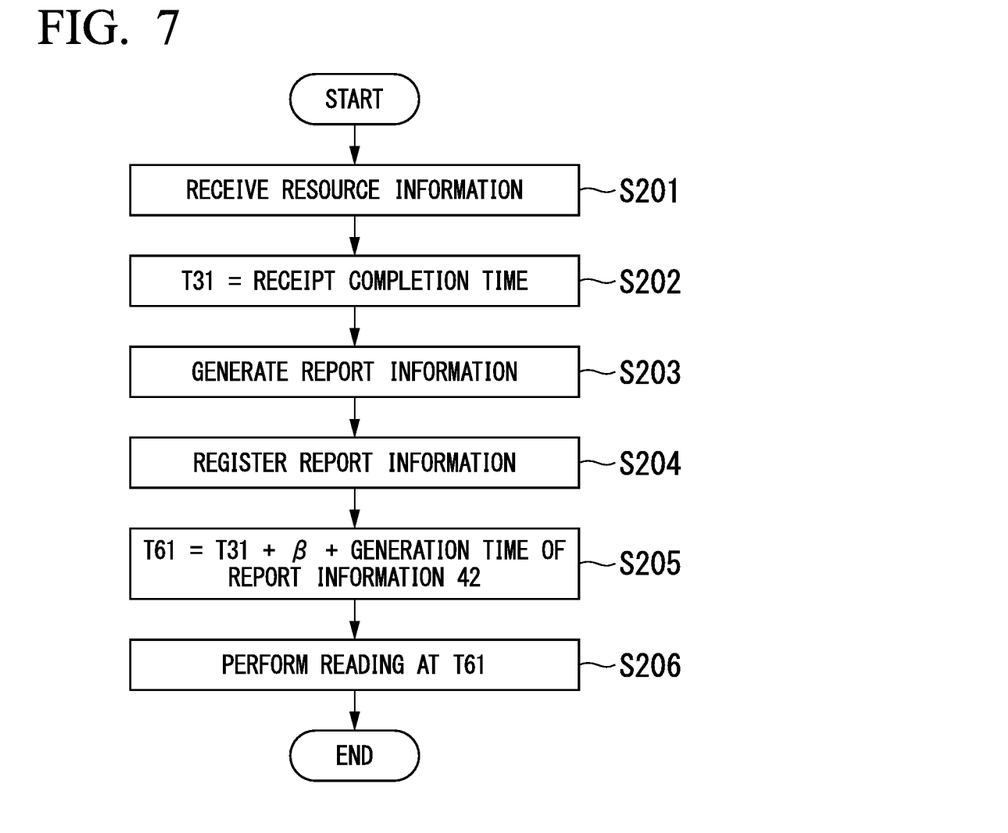
FIG. 7 is a flowchart showing a reading period correction process according to the second embodiment.

FIG. 7 is a flowchart showing a reading period correction process according to the second embodiment. The resource information receiver 101a notifies the information processing unit 102 of resource information 41 received from the upper device 20 (step S201). The resource information receiver 101a notifies the timing adjuster 106a of the time T31 at which the reception of the resource information 41 is completed (step S202).

The information processing unit 102 generates REPORT information 42 using the resource information 41 (step S203). The information processing unit 102 registers the REPORT information 42 in the resource information storage 103 (step S204).

The timing adjuster 106a determines the time T61 at which the bandwidth allocator 104 is to perform reading of the REPORT information 42 (step S205). The timing adjuster 106a notifies the time allocator 104 of the time T61 as the time at which reading of the REPORT information 42 is to be performed. The bandwidth allocator 104 performs a process of reading the REPORT information 42 at the time T61 (step S206). The bandwidth allocator 104 corrects each reading period 51 by shifting the read timing of the REPORT information 42 to the time T61 without changing the reading period 51 itself. That is, the bandwidth allocator 104 changes reading periods 51 of the REPORT information 42 to reading periods 51 starting from the time T61.

The optical transmission device 10a performs the processing from step S201 to step S206 each time the reception of resource information 41 is completed. That is, the optical transmission device 10a calculates the times T61 and T62 at which the bandwidth allocator 104 is to perform reading of the REPORT information 42 from the times T31 and T32 at which reception of the next resource information 41 is completed.

Advantages

In the optical transmission device 10a according to the second embodiment, a process of reading REPORT information 42 is performed at intervals of the reading period 51 starting from the times T61 and T62 calculated as described above. With this configuration, the optical transmission device 10a can match the timings of registration and reading of the REPORT information 42. That is, it is possible to reduce the waiting time from the registration to the reading of the REPORT information 42.

Modification

The value of the time β varies depending on the frame length of the resource information 41. Therefore, the resource information receiver 101a may notify the timing adjuster 106a of both the receipt completion times T31 and T32 and the frame length of the resource information 41. The timing adjuster 106a may determine the time β on the basis of the frame length. The optical transmission device 10a configured in this manner can determine the time at which the bandwidth allocator 104 is to read REPORT information 42 according to the frame length of the resource information 41 and can further reduce the waiting time.

The optical transmission device 10 described above in the first embodiment includes the bandwidth allocator 104 and the timing adjuster 106. The optical transmission device 10a described above in the second embodiment includes the bandwidth allocator 104 and the timing adjuster 106a. The bandwidth allocator 104 periodically reads REPORT information 42, which indicates a bandwidth required for the termination device 30 installed in the wireless station of the mobile communication network to transmit an uplink signal to the upper device 20, from the resource information storage 103. The bandwidth allocator 104 allocates a bandwidth to the termination device 30 on the basis of the read REPORT information 42. On the basis of the timing at which resource information 41 indicating allocation of radio resources to the wireless station is received from the upper device 20, the timing adjusters 106 and 106a adjust the period at intervals of which the bandwidth allocator 104 reads REPORT information 42 from the resource information storage 103. The resource information 41 is used when generating the REPORT information 42. In the optical transmission devices 10 and 10a, the period at intervals of which the bandwidth allocator 104 reads REPORT information 42 is adjusted on the basis of the timing at which resource information 41 is received and therefore it is possible to shorten the time until newly received resource information 41 is reflected in bandwidth allocation to the termination device 30. Accordingly, the optical transmission devices 10 and 10a can immediately perform bandwidth allocation on the basis of the new resource information 41, and therefore are suitable for low delay in the mobile communication network.

The REPORT information 42 indicating bandwidth allocation in the passive optical communication network that connects the optical transmission devices 10 and 10a and the termination device 30 is different from the resource information 41 indicating the allocation of radio resources to a base station in the mobile communication network. Therefore, it takes time for conversion and registration until the REPORT information 42 is obtained from the resource information 41 and the REPORT information 42 is stored in the resource information storage 103. In order to adjust the reading period 51 according to the time for conversion and registration, the timing adjuster 106 notifies the bandwidth allocator 104 of the difference in time δ between the time T1 at which the resource information storage 103 stores the REPORT information 42 according to the resource information 41 and the time T2 at which the bandwidth allocator 104 reads the REPORT information 42. The bandwidth allocator 104 adjusts the reading period 51 on the basis of the difference in time δ, whereby the optical transmission device 10 can reduce the waiting time until new resource information 41 is reflected with high accuracy. In addition, the tuning adjuster 106a notifies the bandwidth allocator 104 of the time T61 obtained by adding the time required until the REPORT information 42 according to the resource information 41 is stored in the resource information storage 103 to the time T31 at which the resource information 41 is received. The bandwidth allocator 104 adjusts the reading period 51 on the basis of the notified time T61 of which the bandwidth allocator 104 is notified, whereby the optical transmission device 10a can reduce the waiting time until new resource information 41 is reflected with high accuracy.

Although embodiments of the present invention have been described above in detail with reference to the drawings, the specific configurations thereof are not limited to those of the embodiments and also include designs or the like without departing from the spirit of the present invention.

INDUSTRIAL APPLICABILITY

The present invention can apply to applications in which it is indispensable to shorten the time required until resource information transmitted from an upper device is reflected in bandwidth allocation to a termination device.

REFERENCE SIGNS LIST 10, 10a Optical transmission device
20 Upper device
30 Termination device
41 Resource information
42 REPORT information
51 Reading period
101, 101a Resource information receiver
102 Information processing unit
103 Resource information storage 104 Bandwidth allocator
105 Transceiver
106, 106a Timing adjuster

The invention claimed is:

1. An optical transmission device comprising:
a bandwidth allocator configured to periodically read bandwidth request information indicating a bandwidth required for a termination device to transmit an uplink signal from a storage and to allocate a bandwidth to the termination device on the basis of the read bandwidth request information; and
a timing adjuster configured to adjust a period at intervals of which the bandwidth allocator reads the bandwidth request information from the storage on the basis of a timing at which resource information used to generate the bandwidth request information is received from an upper device.

2. The optical transmission device according to claim 1, wherein the timing adjuster is further configured to notify the bandwidth allocator of a difference in time between a time at which the storage stores the bandwidth request information based on the resource information and a time at which the bandwidth allocator reads the bandwidth request information from the storage and to cause the bandwidth allocator to adjust the period on a basis of the difference in time.

3. The optical transmission device according to claim 1, wherein the timing adjuster is further configured to notify the bandwidth allocator of a time obtained by adding a time required until the bandwidth request information based on the resource information is stored in the storage to a time at which the resource information is received and to cause the bandwidth allocator to adjust the period on a basis of the time of which the bandwidth allocator is notified.

4. The optical transmission device according to claim 2, wherein the timing adjuster is further configured to notify the bandwidth allocator of the difference in time when the difference in time is equal to or greater than a predetermined threshold value and not to notify the bandwidth allocator of the difference in time when the difference in time is smaller than the threshold value.

5. A bandwidth allocation method comprising:
a bandwidth allocation step including periodically reading bandwidth request information indicating a bandwidth required for a termination device to transmit an uplink signal from a storage and allocating a bandwidth to the termination device on the basis of the read bandwidth request information; and
a timing adjustment step including adjusting a period at intervals of which the bandwidth request information is read from the storage in the bandwidth allocation step on the basis of a timing at which resource information used to generate the bandwidth request information is received from an upper device.

* * * * *